United States Patent
Park et al.

(10) Patent No.: US 10,142,958 B2
(45) Date of Patent: Nov. 27, 2018

(54) SYSTEM AND METHOD FOR DETERMINING POSITION INFORMATION USING CELL INFORMATION

(71) Applicant: NAVER Business Platform Corp., Seongnam-Si, Gyeonggi-Do (KR)

(72) Inventors: Weongi Park, Seongnam-si (KR); Ho Jin Lee, Seongnam-si (KR); Jaewook Yoo, Seongnam-si (KR); Eun Yong Cheong, Seongnam-si (KR); Byeong-Ryeol Sim, Seongnam-si (KR); Byung-Jo Kim, Seongnam-si (KR)

(73) Assignee: Naver Business Platform Corp., Seongnam-si (KR)

( * ) Notice: Subject to any disclaimer, the term of this patent is extended or adjusted under 35 U.S.C. 154(b) by 10 days.

(21) Appl. No.: 15/364,496

(22) Filed: Nov. 30, 2016

(65) Prior Publication Data
US 2017/0086164 A1   Mar. 23, 2017

Related U.S. Application Data

(63) Continuation-in-part of application No. PCT/KR2015/002351, filed on Mar. 11, 2015.

(30) Foreign Application Priority Data

May 30, 2014   (KR) ........................ 10-2014-0065744

(51) Int. Cl.
*H04W 64/00* (2009.01)
*G01S 19/00* (2010.01)
(Continued)

(52) U.S. Cl.
CPC ........... *H04W 64/003* (2013.01); *G01S 19/00* (2013.01); *G01S 19/13* (2013.01); *G01S 19/48* (2013.01);
(Continued)

(58) Field of Classification Search
CPC ..... H04W 64/00; H04W 64/003; G01S 19/13; G01S 19/48
(Continued)

(56) References Cited

U.S. PATENT DOCUMENTS

2003/0117316 A1*   6/2003   Tischer ................ G01S 5/0009
                                                342/357.66
2008/0096661 A1*   4/2008   Ikeda ...................... A63F 13/10
                                                463/40

(Continued)

FOREIGN PATENT DOCUMENTS

JP   H11-4474 A        1/1999
JP   2001024689 A      1/2001
(Continued)

OTHER PUBLICATIONS

International Search Report PCT/ISA/210 for International Application No. PCT/KR2015/002351 dated Jun. 11, 2015.
(Continued)

*Primary Examiner* — Kamran Afshar
*Assistant Examiner* — Farideh Madani
(74) *Attorney, Agent, or Firm* — Harness, Dickey & Pierce, P.L.C.

(57) ABSTRACT

Disclosed is a location information determining method and system for providing a variety of services based on a location. The location information determining method includes receiving cell information; and determining location information that matches the cell information as location information of a mobile terminal from a location information database that stores location information that matches a plurality of pieces of cell information, respectively.

22 Claims, 8 Drawing Sheets

(51) Int. Cl.
*G01S 19/13* (2010.01)
*G01S 19/48* (2010.01)
*H04L 29/08* (2006.01)

(52) U.S. Cl.
CPC .............. *H04L 67/18* (2013.01); *H04L 67/34* (2013.01); *H04W 64/00* (2013.01)

(58) Field of Classification Search
USPC .............................................. 455/456.1–457
See application file for complete search history.

(56) References Cited

U.S. PATENT DOCUMENTS

| | | | | |
|---|---|---|---|---|
| 2011/0238295 A1* | 9/2011 | Yaguchi | ............... | G01C 21/367 701/533 |
| 2012/0309399 A1* | 12/2012 | Wu | .................. | H04W 36/0022 455/437 |
| 2013/0059604 A1* | 3/2013 | Zhu | ...................... | H04W 64/00 455/456.2 |
| 2013/0203438 A1* | 8/2013 | Shin | .................... | H04W 64/003 455/456.1 |
| 2014/0171105 A1* | 6/2014 | Al-Mufti | ............... | G01S 5/0221 455/456.1 |
| 2014/0334264 A1* | 11/2014 | Thaker | .................... | H04W 4/04 367/118 |

FOREIGN PATENT DOCUMENTS

| | | |
|---|---|---|
| JP | 2008136054 A | 6/2008 |
| KR | 10-2009-0063549 A | 6/2009 |
| KR | 10-2011-0094565 A | 8/2011 |
| WO | WO-2006/061970 A1 | 6/2006 |

OTHER PUBLICATIONS

Japanese Office Action dated Dec. 19, 2017 for corresponding Japanese Patent Application No. 2017-510281.

* cited by examiner

SYSTEM AND METHOD FOR DETERMINING POSITION INFORMATION USING CELL INFORMATION

CROSS-REFERENCE TO RELATED APPLICATION(S)

This is a U.S. Continuation-in-Part Application which claims the benefit of priority under 35 U.S.C. § 119 to International Application No. PCT/KR2015/002351, filed Mar. 11, 2015, which claims the benefit of priority under 35 U.S.C. § 119 to Korean Patent Application No. 10-2014-0065744 filed on May 30, 2014, in the Korean Intellectual Property Office (KIPO), the entire contents of both of which are incorporated herein by reference in their entireties.

BACKGROUND

Field

One or more example embodiments relate to a system, apparatus, method, and/or non-transitory computer readable medium for providing a variety of services for user convenience based on a location of a terminal.

Description of Related Art

A mobile communication terminal, such as a smartphone, refers to a smart terminal in which computer supporting functions, for example, Internet communication, information search, etc., are added to a mobile phone. A user may install a desired application on the mobile communication terminal. The user may install a desired application on such a mobile terminal and may use a variety of functions based on the installed application.

For example, the user may execute a find-a-route application to find a route to a destination. The mobile terminal may display a map for guiding the route to the destination based on a precise current location of the user, such as a location provided by a GPS location service, a cell tower triangulation service, a wireless network (e.g., Wi-Fi) location service, a dead-reckoning location service, etc.

Since many users desire to use a location-based service immediately, the time latency caused by determination of a precise location of a user (e.g., the time required to establish a GPS location) may cause user dissatisfaction. Additionally, there may be situations when precise location determination services are not available, such as when a user is inside of a building, underground, outside of cell network range (e.g., geographic issues), when the sky is cloudy (e.g., weather-related issues), etc., and the precise location cannot be determined.

Also, when a current location of the user is accurately input to the mobile terminal, an accurate route guide to a destination may be provided. However, in many cases, the current location of the user may be displayed as a completely different location (e.g., incorrect, inaccurate) of the mobile terminal. For example, although the user is present at an office of region A, a current location of the user may be displayed to be at home of region B. As a result, in the case of using a location-based service, the user may be provided with an inaccurate service.

Accordingly, there is a need for technology capable of more accurately verifying a location of a user and further quickly providing a service based on the verified location of the user.

SUMMARY

One or more example embodiments provide a location information determining method that may further accurately determine a current location of a terminal based on cell information and may quickly provide a location-based service based on the determined current location of the terminal, and a system for distributing an installation file of an application for controlling a mobile terminal to perform the location information determining method.

According to an aspect of one or more example embodiments, there is provided a method of determining location information based on cell information at a location information determining system, the method including receiving cell information; and determining location information that matches the cell information as location information of a mobile terminal from a location information database that stores location information that matches a plurality of pieces of cell information, respectively.

The location information that matches the cell information may include location coordinates corresponding to a centroid value calculated based on a cell shape of a base station to which the mobile terminal belongs.

The determining may include determining administrative district information of a region corresponding to the location information that matches the cell information.

The determining may include determining a neighboring base station adjacent to a base station to which the mobile terminal belongs, based on the cell information; estimating a location of the base station to which the mobile terminal belongs, based on cell identifier information of the neighboring base station; calculating a centroid value of a cell covered by the base station to which the mobile terminal belongs based on a cell shape corresponding to the estimated location of the base station; and determining location information corresponding to the centroid value of the cell as location information of the mobile terminal.

The location information providing method may further include matching location information corresponding to the centroid value of the cell and cell information of the base station to which the mobile terminal belongs and adding the matching information to the location information database.

The location information that matches the cell information may include current location coordinates or approximate location coordinates of the mobile terminal in a cell covered by the base station to which the mobile terminal belongs.

The location information providing method may further include providing a location-based service based on location information of the mobile terminal.

The location information providing method may further include receiving global positioning system (GPS) information or additional location information of the mobile terminal from a satellite; and updating the location information of the mobile terminal based on the GPS information or the additional location information of the mobile terminal.

The cell information may include at least one of identification information of a country in which the mobile terminal is located, communication company identification information, location area code (LAC) information, identification information of a base station to which the mobile terminal belongs, and identification information of a cell covered by the base station.

The determining may include displaying a region to which the mobile terminal belongs to be further clearly viewed as coverage of the region becomes narrower.

The determining may include determining location information that matches previous cell information as location information of the mobile terminal in response to absence of cell information of the mobile terminal.

According to another aspect of one or more example embodiments, there is provided a location information determining system including an information receiver configured to receive cell information; and a location determiner configured to determine location information that matches cell information as location information of a mobile terminal from a location information database that stores location information that matches a plurality of pieces of cell information, respectively.

The location information that matches the cell information may include location coordinates corresponding to a centroid value calculated based on a cell shape of a base station to which the mobile terminal belongs.

The information provider may be further configured to determine administrative district information of a region corresponding to the location information that matches the cell information.

The information provider may be further configured to estimate a location of a base station to which the mobile terminal belongs based on cell identifier information of a neighboring base station adjacent to the base station to which the mobile terminal belongs, and to determine location information of the mobile terminal based on a cell shape of a cell corresponding to the estimated location of the base station.

The location determiner may be further configured to match location information corresponding to a centroid value of the cell and cell information of the base station to which the mobile terminal belongs, and to add the matching information to the location information database.

The location information that matches the cell information may include a current location coordinates or an approximate location coordinates of the mobile terminal within a cell covered by the base station to which the mobile terminal belongs.

The information provider may be further configured to provide a location-based service based on location information of the mobile terminal.

The location information of the mobile terminal may be updated based on GPS information or additional location information of the mobile terminal.

According to another aspect of one or more example embodiments, there is provided a file distribution system for distributing an installation file for installing an application on a mobile terminal of a user, the file distribution system including an installation file manager configured to store and manage the installation file; and an installation file transmitter configured to transmit the installation file to the mobile terminal in response to a request from the mobile terminal. The application is configured to control the mobile terminal to determine location information that matches the cell information as location information of the mobile terminal from a location information database that stores location information that matches a plurality of pieces of cell information, respectively, and to control the mobile terminal to display the location information of the mobile terminal.

According to another aspect of one or more example embodiments, there is provided a mobile terminal that includes a memory having computer readable instructions stored thereon, and at least one processor configured to execute the computer readable instructions to connect to a base station associated with a data network, receive cell information from a base station, the cell information including at least one of location area code (LAC) information, identification information of the base station, coverage area information related to the area covered by the base station, transmit a request for a location-based service, the request including the received cell information and a mobile terminal identifier, and receive a location-based service in response to the request.

The at least one processor may be further configured to perform the receive the location-based service by determining administrative district information based on the received cell information and centroid information stored in a location information database associated with the base station, storing the administrative district information in the location information database in association with the mobile terminal identifier, determining a gradation level associated with the requested location-based service, extracting approximate location information related to the mobile terminal based on the determined gradation level and the stored administrative district information, and receiving the location-based service, the location-based service provided based on the approximate location information.

The location-based service may be at least one of a weather information providing service, a discount coupon providing service, an information providing service, a restaurant related information providing service, a financial related service, a music providing service, and a navigation service.

The at least one processor may be further configured to update the cell information upon receiving a user instruction to request the location-based service, and update the cell information when the mobile terminal connects to a second base station.

According to some example embodiments, it is possible to determine a current location of a terminal and to provide a further accurately and quickly provide a location-based service to a mobile terminal.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
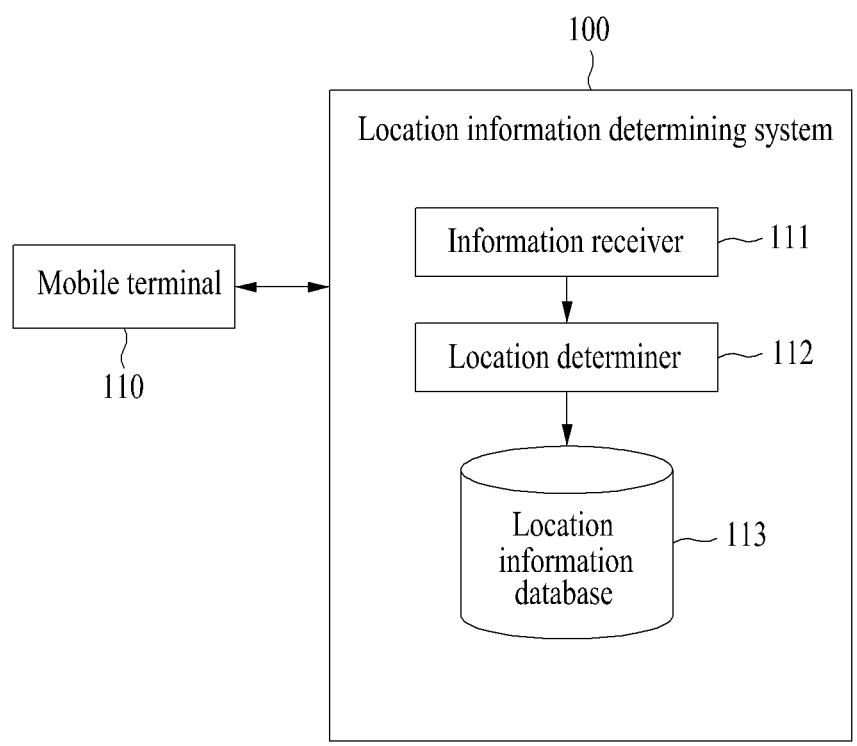
FIG. 1 is a block diagram illustrating an example of an execution environment of a location information determining method according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below.

Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code.

Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a block diagram illustrating an example of an execution environment of a location information determining method according to at least one example embodiment. FIG. 1 illustrates a mobile terminal 110 of a user, a location information determining system 100, and a location information database 113.

The mobile terminal 110 may be a portable device of the user capable of performing mobile communication and data communication. In response to a request from the mobile terminal 110, the location information determining system 100 may determine location information of the mobile terminal 110 by referring to the location information database 113.

Here, the location information determining system 100 may include an information receiver 111 and a location determiner 112 to further accurately determine a current location of the mobile terminal 110 based on cell information, and to provide a service based on the determined current location to the mobile terminal 110. The determined current location of the mobile terminal 110 may be a precise location of the mobile terminal 110 and/or an imprecise and/or approximate location of the mobile terminal 110.

For example, a location-based service may include a weather information service based on the current location of a terminal, a location-based knowledge search service (e.g., a search engine service, etc.), a location-based app search service (e.g., a search service provided through an app, an app finding service, etc.), a location-based discount information service (e.g., a coupon search service, etc.), a location-based game service, a location-based music service, a location-based navigation (e.g., find-a-route) search service, and the like.

Although FIG. 1 illustrates the mobile terminal 110 and the location information determining system 100 as separate constituent elements, it is only an example. The location information determining system 100 may be included in the mobile terminal 110. For example, in response to an execution of an app to use a location-based service, the mobile terminal 110 may determine location information that matches cell information of the mobile terminal 110 and may display the location-based service based on the determined location information.

Although FIG. 1 illustrates that the location information database 113 is included in the location information determining system 100, it is only an example. The location information database 113 may be included in a separate storage device connected to the location information determining system 100 over a network.

Figure 2:
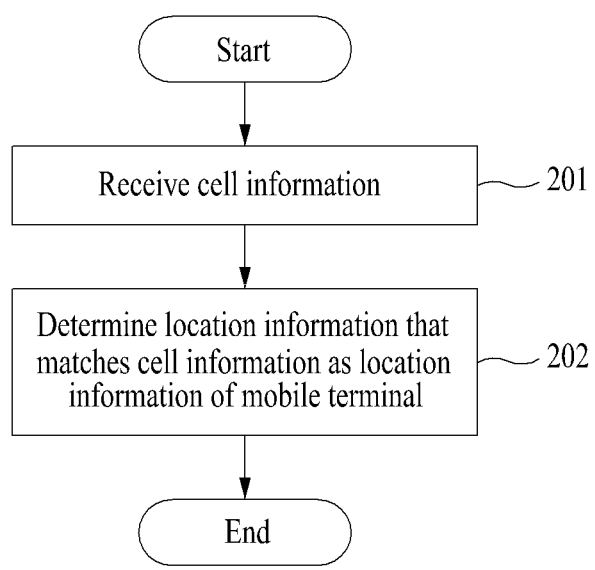
FIG. 2 is a flowchart illustrating an example of a location information determining method according to at least one example embodiment.

FIG. 2 is a flowchart illustrating an example of a location information determining method according to at least one example embodiment. The location information determining method of FIG. 2 may be performed at the location information determining system 100 of FIG. 1.

In operation 201, the information receiver 111 may receive cell information of the mobile terminal 110 from a base station, a cellular network service, a Wi-Fi network service, a specialized location providing service, etc. Here, the cell information may include at least one of identification information of a country in which the mobile terminal 110 is located, communication company identification information, location area code (LAC) information, identification information of a base station (and/or other wireless network station, collectively referred to herein as a base station) to which the mobile terminal 110 belongs, and identification information of a cell (and/or coverage area, service area, etc.) covered by the base station, the IP address and MAC address assigned to the mobile terminal 110, the IP address and the MAC address assigned to the base station to which the mobile terminal 110 belongs, the name of the base station to which the mobile terminal 110 belongs (e.g., SSID, etc.), a billing address associated with the base station (e.g., the billing address for the customer that has been assigned a wireless router, etc.), etc. The cell information may be stored in a location information database 113. The location information database 113 may be fully or partially stored in the memory of the mobile terminal 110 and/or may be via a network through the network interface of the mobile terminal 110. When the location information database 113 is stored in the memory of the mobile terminal 110, the contents of the location information database 113 may be periodically updated, updated on demand (e.g., based on user input/instruction), and/or updated in real-time by an online version of the location information database 113.

The cell information may pertain to a specific base station and may be provided to the mobile terminal 110 when the mobile terminal 110 connects to that particular and/or desired base station, and the mobile terminal 110 may receive new cell information when the mobile terminal 110 connects to a new and/or different base station. When the mobile terminal 110 connects to a Wi-Fi network, the cell information may be provided by the Wi-Fi router and/or a data network server servicing the Wi-Fi router, or may be provided by a specialized location providing service that may provide an approximate location of the mobile terminal 110 based on the IP address of the mobile terminal 110 and/or the IP address of the wireless router that the mobile terminal 110 is connected and the known geographic location of the wireless router.

The cell information may be provided to the mobile terminal 110 in real-time (e.g., at the time that the mobile terminal 110 requests the location-based service, etc.) and/or may have been provided previously (e.g., at the time the mobile terminal 110 was last in of a base station, a Wi-Fi router, a femto-cell, etc.) and stored in the memory of the mobile terminal 110.

In an example in which the mobile terminal 110 and the location information determining system 100 are configured as physically separate apparatuses, the information receiver 111 may receive the cell information from the mobile terminal 110. Here, the base station may verify a location of the mobile terminal 110 periodically and/or in real time. To this end, every time the mobile terminal 110 moves, cell information indicating a current location of the mobile terminal 110 may be updated. If the user is to use a location-based service, such as a weather information service, the mobile terminal 110 may transmit cell information of the mobile terminal 110 to the location information determining system 100. Here, the cell information of the mobile terminal 110 may be stored in an internal memory of the mobile terminal 110 and/or a subscriber identification module (SIM) card. If, however, the current location information of the mobile terminal 110 is not available, for example, when the mobile terminal 110 has lost connection to the base station, is out of reception range of the base station, the user has disabled the antenna for cellular networks or wireless networks, etc., the mobile terminal 110 may provide the previously stored cell information to the location information determining system 100.

In an example in which the location information determining system 100 is included in the mobile terminal 110, the information receiver 111 may receive cell information from a base station (not shown). Here, the information receiver 111 may receive and update cell information from the base station periodically and/or in real time.

If the user is to use a location-based service, such as a weather information service, etc., the location information determining system 100 may transmit the associated cell information to the location-based service.

In operation 202, the location determiner 112 may search the location information database 113 for location information that matches the cell information received at the information receiver 111. The location determiner 112 may determine the found location information as location information of the mobile terminal 110.

Here, the determined location information may include current location coordinates and/or approximate location coordinates of the mobile terminal 110 in a cell covered by the base station to which the mobile terminal 110 belongs (e.g., is connected, or has connected to recently, such as the most recent base station that the mobile terminal 110 has connected to, etc.), based on the cell information of the mobile terminal 110.

For example, location coordinates corresponding to a centroid value of a cell covered by each base station may be matched to at least one of the cell information information entries in the location information database 113 and may be used as location information of the mobile terminal 110. The location determiner 112 may search the location information database 113 for location information that matches at least one piece (e.g., entry, field, and/or value) of information included in the cell information. For example, the location determiner 112 may search the location information database 113 for location information that matches the cell identifier information and may determine the found location information as location information of the mobile terminal 110.

Here, if the mobile terminal 110 is located at a location corresponding to the centroid value of the cell, the location determiner 112 may determine location coordinates that match an actual location and/or approximate location of the mobile terminal 110 as location information of the mobile terminal 110. In other words, the location information of the mobile terminal 110 may not be precise location information (e.g., location information precise and/or accurate to 7.8 meters or less as found with GPS and other related location information technologies), but rather may be approximate location information that is accurate within a few city blocks, the size of a building, a geographic landmark, a neighborhood, a region, a city, etc. For example, if the mobile terminal 110 is located at park P of region A, the location determiner 112 may determine the park P of the region A as location information of the mobile terminal 110.

If the mobile terminal 110 is not located at a location corresponding to the centroid value of the cell, the location determiner 112 may determine approximate location coordinates included in a radius of the cell as location information of the mobile terminal 110 despite a slight deviation from an actual location of the mobile terminal 110. Here, the approximate location coordinates may include approximate location coordinates adjacent to actual location coordinates of the mobile terminal 110 within a desired (or alternatively, predetermined) error range. Additionally, the error range and/or degree of confidence in the location coordinates may be included in the entry for the approximate location coordinates in the location information database 113.

For example, if the mobile terminal 110 is located at the park P of the region A, approximate location coordinates may include location coordinates corresponding to mart Q (e.g., a business and/or building) of the region A. That is, the location determiner 112 may determine location coordinates within the region A as location information of the mobile terminal 110. As described above, since a relatively large number of small base stations, such as femtocells, microcells, etc., may be present and/or are known to be present in a downtown area (e.g., a building, a block, a neighborhood, a city, etc.) and the location coordinates of the base stations may be known, approximate location coordinates may include location coordinates close to an actual location of the mobile terminal 110.

The location determiner 112 may display the determined location information of the mobile terminal 110 on a display of the mobile terminal 110. Here, the location determiner 112 may simply display the location information of the mobile terminal 110 on the mobile terminal 110, and may determine administrative district information (e.g., street address, zip code, neighborhood information, city information, county information, etc.) corresponding to the location information of the mobile terminal 110 and may display the administrative district information and the location information on the mobile terminal 110 together. Here, the administrative district information may indicate an administrative district corresponding to location coordinates of the mobile terminal 110.

The location determiner 112 may display a region to which the mobile terminal 110 belongs to be further clearly viewed as coverage of the region becomes narrower. For example, as an administrative district unit, such as a country, -si, -gu, -dong, etc., (which is based on a Korean address system), or state, county, city, neighborhood, street, block, etc., (based on the United States address system), etc., becomes narrower, the location determiner 112 may display the location information of the mobile terminal 110 to be clearly viewed using a gradation. For example, in response to providing all of location information and administrative district information to the mobile terminal 110, at least one of location coordinates corresponding to a centroid value of a cell covered by each base station, administrative district information that includes the location coordinates corresponding to the centroid value, and cell identification information may be matched and pre-stored in the location information database 113.

For example, administrative district information may include AA-si BB-gu CC-dong, BB-gu CC-dong, CC-dong, DD state EE city FF avenue, EE city FF avenue, FF avenue, or FF avenue n code, etc. Here, if location information of the mobile terminal 110 and the administrative district information are determined as 'AA-si BB-gu CC-dong', an administrative district unit becomes narrower from AA-si to CC-dong. Thus, the mobile terminal 110 may provide the current location of the mobile terminal 110 for the user by clearly displaying the administrative district information in order from AA-si to CC-dong. Since location information of the mobile terminal 110 and administrative district information are determined as described above, the mobile terminal 110 may display a location-based service based on at least one of the determined location information and administrative district information. Additionally, the gradation of the location information may be based on the location-based service being used as well. For example, if a location-based service only requires state-level location information, or city-level location information, the desired level/gradation of location information is provided to the location-based service. Moreover, because of the different scales of geographic area covered by each gradation level of location information, the higher gradation levels of location information may be assumed to be up-to-date, accurate, and/or correct for the mobile terminal 110 for longer periods of time. In other words, the location-based service and/or location information database 113 may presume that the state-level approximate location of the mobile terminal 110 is up-to-date for a longer period of time than the block-level approximate location of the mobile terminal 110. Therefore, the state-level approximate location (or higher gradation level location information) of the mobile terminal 110 may be used for longer periods of time before needing updating and/or refreshing than lower gradation level approximate information.

For example, the location-based service may include a weather information service based on a current location of a terminal, a location-based knowledge search service, a location-based app search service, a location-based discount information service, a location-based game service, a location-based music service, a navigation (e.g., find-a-route) service, a location-based map service, and the like, and the gradation level of the approximate location required for each of the services may be different. For example, a location based navigation service may need street or block level accuracy of the mobile terminal 110's current location, whereas a weather information service or location-based knowledge search service may only require a neighborhood or city level approximate location of the mobile terminal 110.

Here, in the case of the location-based map service, the mobile terminal 110 may initially display relatively wide coverage of an upper administrative district, such as country, -si-, -gun, etc., in administrative districts corresponding to location information, and may display a detailed administrative district, such as -gu, -dong, etc., through a user selection. Here, an example of a location information determining system that provides a location-based service will be further described with reference to FIG. 6.

As described above with reference to FIG. 2, in the case of providing a location-based service based on a location of the mobile terminal 110 that is determined based on cell information, the mobile terminal 110 may receive the location-based service immediately after requesting the location-based service.

For example, the location information determining system 100 may search the location information database 113 for location information that matches the current cell information of the mobile terminal 110, and may provide a location-based service based on the found location information to the mobile terminal 110. Accordingly, a lengthy amount of time for calculating an actual location of the mobile terminal 110 is not required, and the location information determining system 100 may provide the location-based service immediately in response to a request for the location-based service from the mobile terminal 110. Additionally, if the actual location of the mobile terminal 110 is unavailable, for example, if there is weather-based interference with the mobile terminal's GPS receiver (e.g., cloudy skies, atmospheric interference, etc.), geographic-based interference (e.g., the mobile terminal is underground, indoors, in a location with poor, or non-existent, service, the skies are cloudy, etc.), the approximate location of the mobile terminal 110 may be used to continue to provide the location-based service to the user. Also, the use of the approximate location information provides a further beneficial because it can save the battery life and/or reduce the amount of electricity consumed by the mobile terminal 110 because the approximate location information does not require that an additional battery draining antenna and/or sensor, such as the antenna found in a GPS receiver, be active and may instead rely on the mobile network antenna (e.g., cellular antenna, Wi-Fi antenna, etc.) that is already active to provide connection to the location-based service to determine the approximate location information of the mobile terminal 110.

Moreover, according to some example embodiments, when the mobile terminal 110 submits a request for a location-based service, the request may include the cell information that has been stored in the memory of the mobile terminal 110. Additionally, the location-based service may request the cell information associated with the mobile terminal 110 from the online location information database 113 after receiving the request for the location-based service from the mobile terminal 110. In this example, the request may include a unique identifier for the mobile terminal 110, such as a phone number, an email address, a manufacturer ID, a SIM ID, etc.

As another example, if the location information determining system 100 is included in the mobile terminal 110, the location information determining system 100 may search the location information database 113 for location information that matches the cell information received by the mobile terminal 110 from the base station that the mobile terminal 110 belongs to (and/or is associated with), or from the cell information stored in the memory of the mobile terminal 110. The location information determining system 100 may display a location-based service based on the found location information.

Here, although approximate location coordinates is not a perfectly accurate location of the mobile terminal 110, the approximate location coordinates may correspond to a region in which the mobile terminal 110 is currently present, such as a '-dong' unit region. Accordingly, the location information determining system 100 may not provide a location-based service of another region different from the current location of the mobile terminal 110, which may lead to increasing the user satisfaction for the location-based service.

Figure 3:
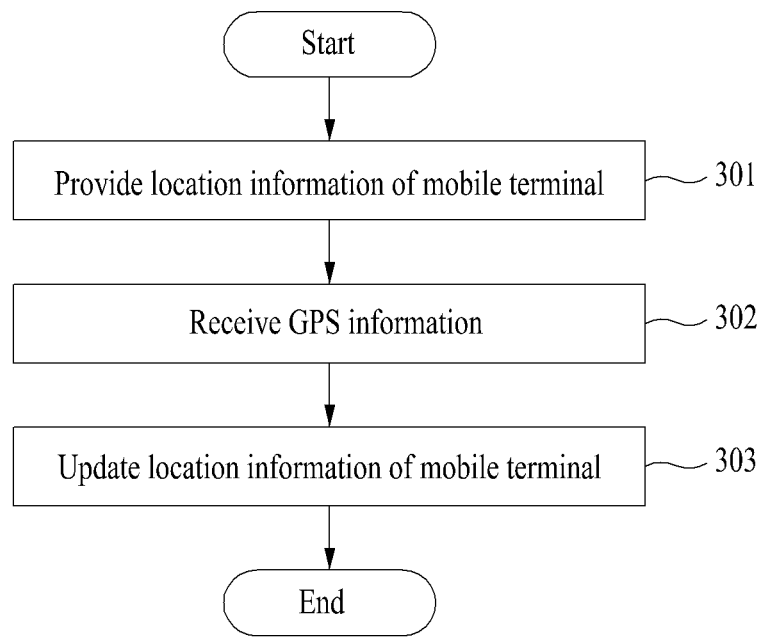
FIG. 3 is a flowchart illustrating another example of a location information determining method according to at least one example embodiment.

FIG. 3 is a flowchart illustrating another example of a location information determining method according to at least one example embodiment. The location information determining method of FIG. 3 may be performed at the location information determining system 100 of FIG. 1.

In operation 301, the location determiner 112 may provide the mobile terminal 110 with location information of the mobile terminal 110 that is determined based on cell information of the mobile terminal 110. Here, the cell information of the mobile terminal 110 may be received at the information receiver 111 from the mobile terminal 110, or may be received from a base station (not shown).

Here, the location determiner 112 may determine administrative district information and may display the determined administrative district information on the mobile terminal 110 together with the location information. A location-based service based on at least one of the location information and the administrative district information may be displayed on the mobile terminal 110. Here, an operation of displaying location information and administrative district information of the mobile terminal 110 determined at the location determiner 112 on the mobile terminal 110 and an operation of displaying a location-based service are same as operations 201 and 202 of FIG. 2 and a further detailed description will be omitted.

In operation 302, the information receiver 111 may receive additional location information of the mobile terminal 110 from a global positioning system (GPS), GLONASS system, a beacon, other location service provided from a satellite, wireless fidelity (Wi-Fi), etc.

The location determiner 112 may calculate actual location coordinates of the mobile terminal 110 based on additional location information of the available GPS and/or WiFi, beacon, etc., and may determine the calculated location coordinates as location information of the mobile terminal 110.

In operation 303, the location determiner 112 may update location information provided to the mobile terminal 110 with the determined location information of the mobile terminal 110.

For example, when approximate location coordinates of the mobile terminal 110 are determined and displayed as location information of the 110 in operation 301, the location determiner 112 may update and display the approximate location coordinates of the mobile terminal 110 as actual location coordinates in operation 303. The location determiner 112 may update and display a location-based service based on the updated actual location coordinates. As described above, the location determiner 112 may provide a location-based service based on the approximate location coordinates so that the user may initially verify the approximate location coordinates, and may provide the location-based service updated based on the actual location coordinates. Accordingly, it is possible to decrease a user dissatisfaction coming from a waiting time for providing a location-based service, and to provide a further accurate location-based service.

Figure 4:
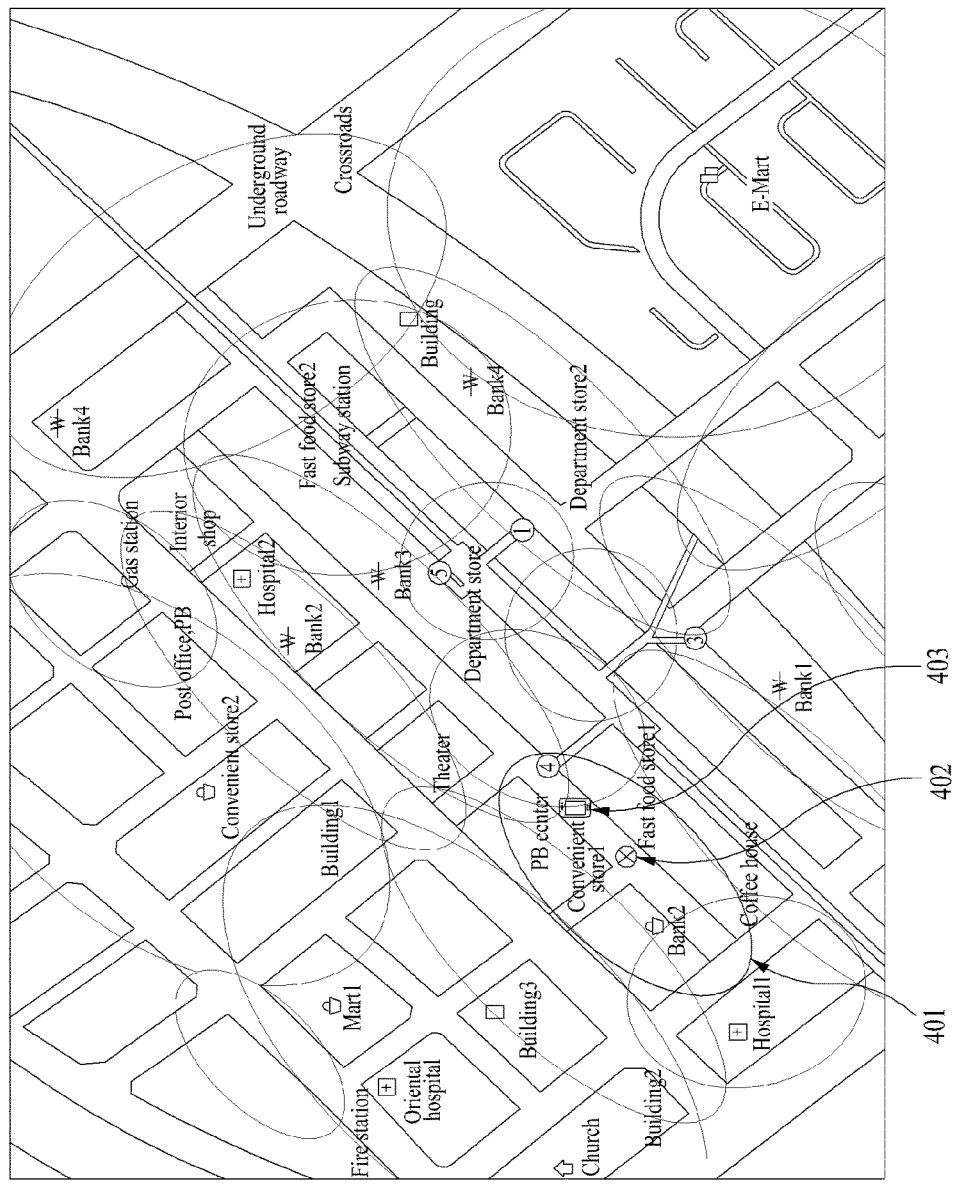
FIG. 4 illustrates an example of determining location information of a mobile terminal based on cell information according to at least one example embodiment.

FIG. 4 illustrates an example of determining location information of a mobile terminal based on cell information according to at least one example embodiment.

Referring to FIG. 4, many small base stations, such as femtocells, microcells, etc., may be installed in a downtown area.

For example, the location information determining system 100 may calculate a centroid value of a cell 401 based on a shape of the cell 401 covered by a base station 1. Here, the cell 401 may be in a variety of shapes, such as a polygonal shape, a circular shape, an oval shape, and the like. The location information determining system 100 may construct the location information database 113 by matching GPS or WiFi location coordinates 402 corresponding to the centroid value of the cell 401 to identification information of the cell 401.

Here, in addition to the identification information of the cell 401, the location information determining system 100 may match cell information, such as identification information of the base station 1, LAC1 information, etc., to GPS or WiFi location coordinates corresponding to the centroid value of the cell 401.

The location information determining system 100 may calculate a centroid value of a cell covered by each of all of base stations present in each region. The location information determining system 100 may construct the location information database 113 by matching cell information to GPS or WiFi location coordinates corresponding to the calculated centroid value of the cell covered by each base station.

Also, in addition to the cell information, the location information determining system 100 may construct the location information database 113 by matching administrative district information to GPS or WiFi location coordinates corresponding to the centroid value of the cell 401. In the same manner, the location information determining system 100 may also construct the location information database 113 by matching cell information and administrative district information to GPS or WiFi location coordinates corresponding to a centroid value of each cell.

For example, in response to a request for a location-based service, such as a search for an adjacent bank, and the like, the information receiver 111 may receive cell information of the mobile terminal 110 from the mobile terminal 110 or a base station (not shown). The location determiner 112 may determine location coordinates that match the cell information of the mobile terminal 110 as location information of the mobile terminal 110. For example, the location determiner 112 may search the location information database 113 for the GPS or WiFi location coordinates 402 that match identification information of the cell 401, and may determine the found GPS or WiFi location coordinates 402 as location information of the mobile terminal 110. Here, the GPS or WiFi location coordinates 402 may be GPS or WiFi location coordinates corresponding to the centroid value of the cell 401.

The location determiner 112 may display a location-based service, such as a search for an adjacent bank, based on the determined location information. Referring to FIG. 4, although an actual location of the mobile terminal 110 is location coordinates 403 in front of fast food store 1, the location determiner 112 may determine the location information of the mobile terminal 110 as location coordinates, for example, the GPS or WiFi location coordinates 402, adjacent to the location coordinates 403, and may display a location-based service based on the GPS or WiFi location coordinates 402 on the mobile terminal 110 immediately in response to a request for the location-based service.

According to some example embodiments, the location information determining system 100 may provide a location-based service immediately without using a time to calculate the actual location coordinates 403 of the mobile terminal 110.

Further, in many cases, the location-based service may be provided based on an administrative district unit, for example, -dong, -street, etc. An administrative district corresponding to the actual location coordinates 403 of the mobile terminal 110 may be the same as that of the determined GPS or WiFi location coordinates 402, or may correspond to a neighboring administrative district thereof. Accordingly, the location information determining system 100 may provide a further accurate location-based service.

Here, the location information determining system 100 may initially display a relatively wide administrative district based on the actual location coordinates 403 of the mobile terminal 110, and may display a detailed administrative district based on a user selection. The location information determining system 100 may display administrative districts, starting with an upper administrative district, to be clearly viewed as corresponding coverage becomes narrower up to the actual location coordinates 403 of the mobile terminal 110.

Also, as described above with FIG. 3, in response to receiving additional location information, such as GPS information, WiFi, etc., of the mobile terminal 110, the location information determining system 100 may calculate the actual location coordinates 403 of the mobile terminal 110 based on the additional location information, such as GPS information, WiFi, etc. The location information determining system 100 may update the displayed GPS or WiFi location information 402 of the mobile terminal 110 with the actual location coordinates 403. Accordingly, the location-based service based on the location information of the mobile terminal 110 may be updated based on the actual location coordinates 403.

Figure 5:
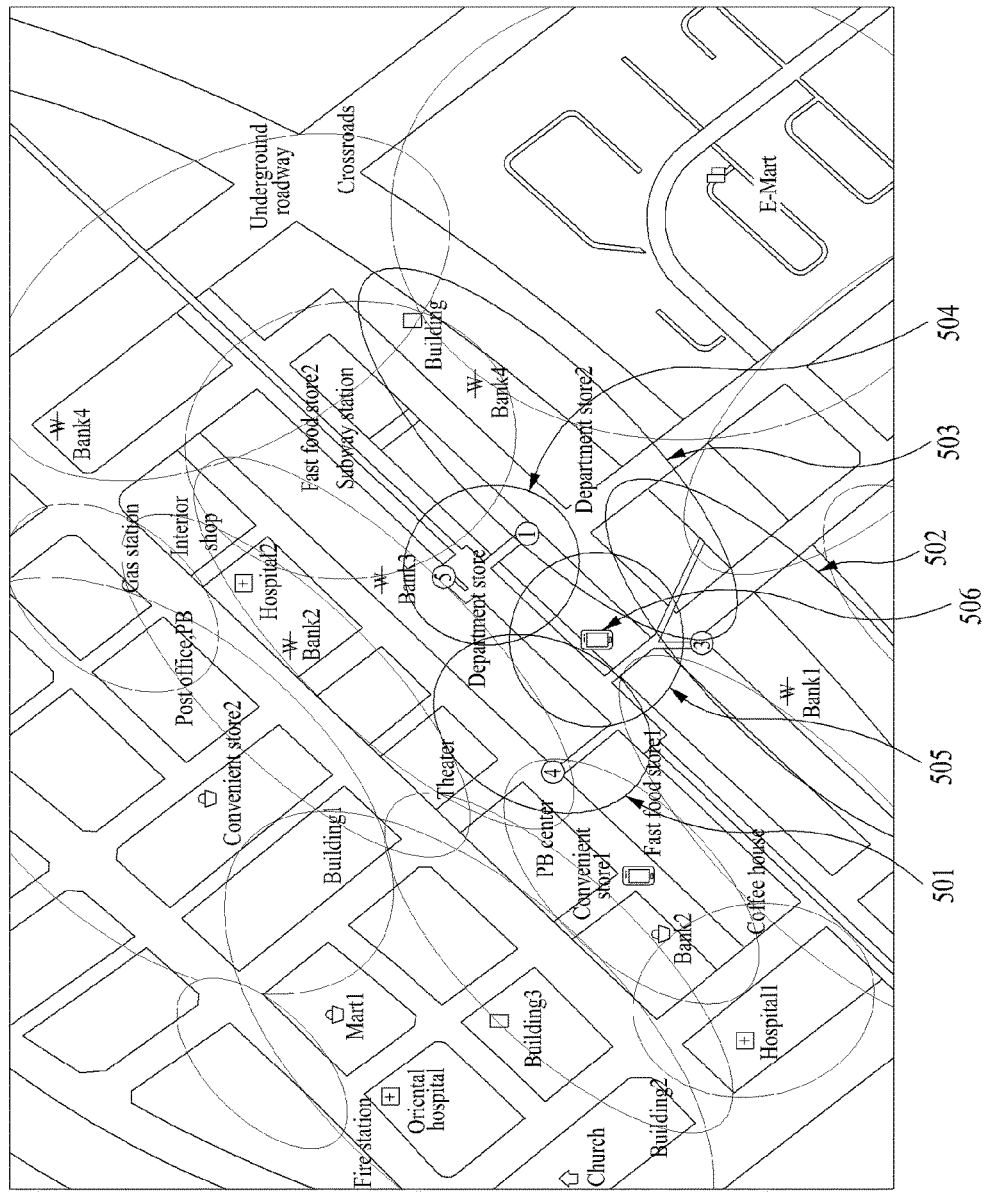
FIG. 5 illustrates an example of determining location information of a mobile terminal by estimating a base station based on cell information according to at least one example embodiment.

FIG. 5 illustrates an example of determining location information of a mobile terminal by estimating a base station based on cell information according to at least one example embodiment.

An operation of determining location information of the mobile terminal 110 when location coordinates that match cell information of the mobile terminal 110 are absent in the location information database 113 will be described with reference to FIG. 5.

The location determiner 112 may determine at least one neighboring base station present around a base station to which the mobile terminal 110 belongs, from the location information database 113, based on cell information received at the information receiver 111.

Here, the location determiner 112 may search for at least one neighboring base station present around the base station to which the mobile terminal 110 belongs by comparing the received cell information and cell information stored in the location information database 113. For example, the location determiner 112 may retrieve base stations that match base station identifier information, LAC information, etc., included in the received cell information, as neighboring base stations. The location determiner 112 may determine location coordinates of the mobile terminal 110 based on cell identifier information of a neighboring base station.

For example, base stations 1, 2, 3, and 4 covered by cells 501, 502, 503, and 504, respectively, may be determined as neighboring base stations. In general, since cell identifier information ends with a predetermined specific value, for example, 11, 17, 19, etc., the location determiner 112 may estimate a location of a base station to which the mobile terminal 110 belongs based on cell identifier information of the cells 501, 502, 503, and 504. For example, the location determiner 112 may estimate that the base station to which the mobile terminal 110 belongs is located in cell 505.

Here, if it is difficult to estimate the base station to which the mobile terminal 110 belongs, or if cell information of the mobile terminal 110 received at the information receiver 111 is absent due to an estimation error, the location determiner 112 may determine location coordinates of the mobile terminal 110 based on just previously received last cell information. For example, the location determiner 112 may determine location information that matches the last received cell information as location coordinates of the mobile terminal 110. The location determiner 112 may calculate a centroid value based on a cell shape of the estimated cell 505, and may determine location coordinates 506 corresponding to the calculated centroid value as location information of the mobile terminal 110. The location determiner 112 may also determine administrative district information of the mobile terminal 110. The location determiner 112 may display at least one of location information and administrative district information of the mobile terminal 110. Here, the location determiner 112 may display a location-based service based on at least one of the location information and the administrative district information.

The location determiner 112 may match the location coordinates 506 corresponding to the calculated centroid value to the cell information of the mobile terminal 110, and may add the matching information to the location information database 113. Here, the location determiner 112 may also match and thereby add the administrative district information to the location information database 113.

Figure 6:
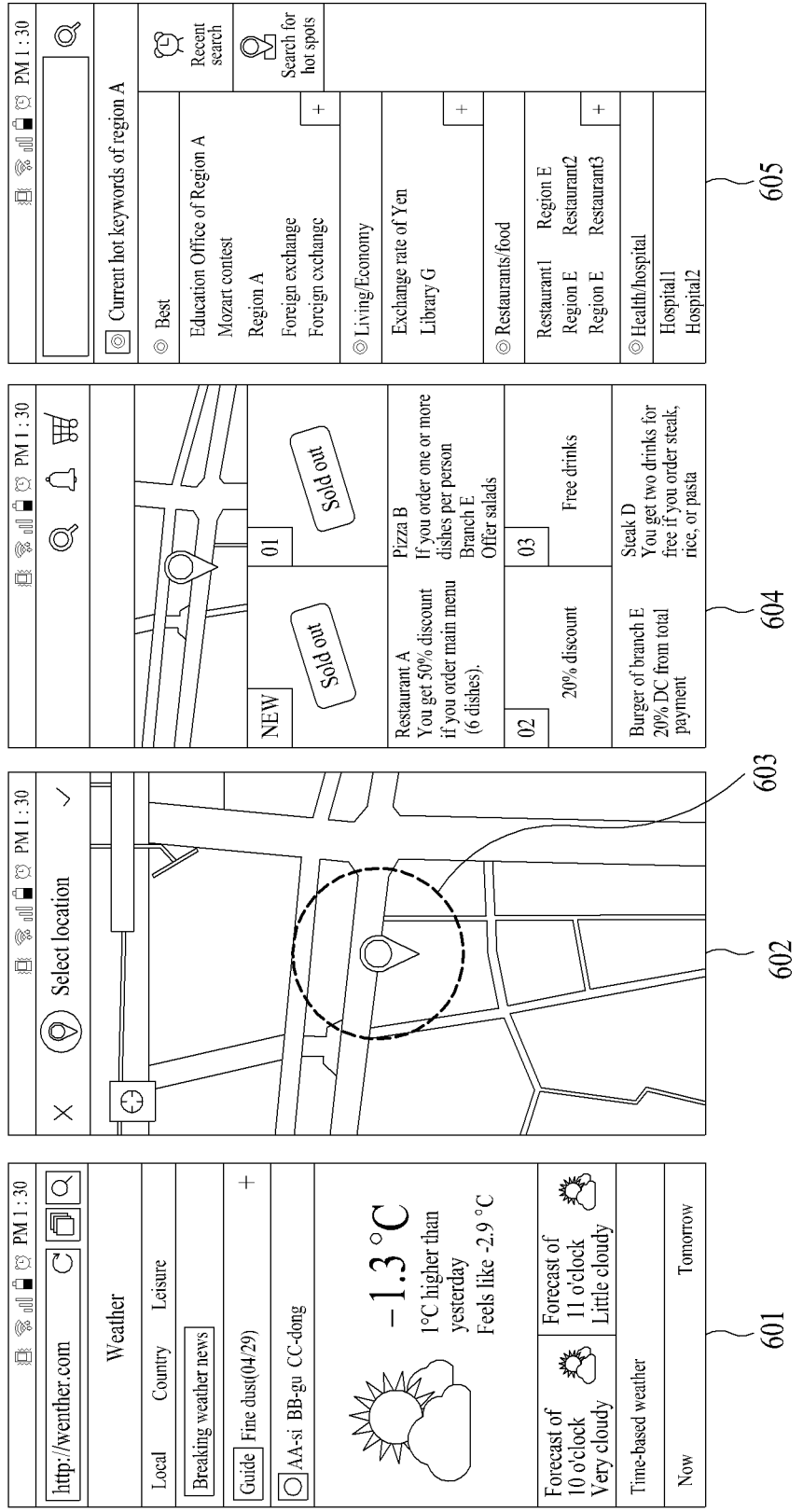
FIG. 6 illustrates examples of providing a location-based service to a mobile terminal according to at least one example embodiment.

FIG. 6 illustrates examples of providing a location-based service to a mobile terminal according to at least one example embodiment.

A screen 601 of FIG. 6 is provided to describe an example of displaying weather information on the mobile terminal 110 based on location information of the mobile terminal 110.

For example, in response to the mobile terminal 110 executing a weather application and requesting the location information determining system 100 for weather information of a region in which the mobile terminal 110 is located, the location information determining system 100 may provide the weather information to the mobile terminal 110 based on the determined location information of the mobile terminal 110. In this case, since a location of the mobile terminal 110 is determined based on the cell information, the location information determining system 100 may provide weather information of a location or an administrative district associated with the mobile terminal 110 immediately in response to a request from the mobile terminal 110. Such a weather information service is provided based on a unit, for example, '-dong', the location information determining system 100 may provide an accurate weather information service to a user based on only approximate location coordinates, instead of using accurate location coordinates of the mobile terminal 110.

A screen 602 of FIG. 2 is provided to describe an example of displaying a knowledge search app on the mobile terminal 110.

For example, in response to the mobile terminal 110 executing the knowledge search app and requesting the location information determining system 100 for a location of a specific building, such as a hospital, a bank, etc., the location information determining system 100 may provide the location of the specific building to the mobile terminal 110 based on the determined location information of the mobile terminal 110.

Here, the location information determining system 100 may determine administrative district information corresponding to the location information of the mobile terminal 110, and may also provide the determined administrative district information and location information together to the mobile terminal 110. All of the location of the specific building, location information of the mobile terminal 110, and administrative district information thereof may be displayed on the mobile terminal 110. Here, the location information of the mobile terminal 110 may be approximate location coordinates. Accordingly, the location information determining system 100 may also provide the mobile terminal 110 with information about a cell area covered by a base station to which the mobile terminal 110 belongs. For example, a cell region 603 may be displayed on the mobile terminal 110 together with the location of the specific building, administrative district information, and location information of the mobile terminal 110. Here, the cell region 603 may be displayed on the mobile terminal 110 using a highlight, an outline, a shadowing processing, etc., to be distinguished from a remaining region excluding the cell region 603 in which the mobile terminal 110 is located.

Referring to a screen 604 of FIG. 4, in response to the mobile terminal 110 executing a discount information app and requesting the location information determining system 100 for discount information, the location information determining system 100 may provide the mobile terminal 110 with discount information available in a region in which the mobile terminal 110 is located, based on the determined location information of the mobile terminal 110.

For example, the location information determining system 100 may provide the mobile terminal 110 with information associated with stores that offer discount coupons among stores located in the region in which the mobile terminal 110 is located and a neighboring region thereof. For example, a discount coupon available only during a specific time, such as a lunchtime, a specific menu discount coupon, etc., may be provided to the mobile terminal 110. Here, if a number of discount coupons is limited or if a coupon service time is fixed, a number of remaining coupons and the coupon service time may be displayed on the mobile terminal 110.

Referring to a screen 605 of FIG. 6, in response to the mobile terminal 110 executing a search app, the location information determining system 100 may provide the mobile terminal 110 with an app associated with a region in which the mobile terminal 110 is located, based on the determined location information of the mobile terminal 110. Here, the location information determining system 100 may provide a related app for each category, for example, living/economy, restaurants, hospitals, finance, best, etc.

Also, in response to the mobile terminal 110 executing a location-based music app, the location information determining system 100 may provide the mobile terminal 110 with music associated with a region in which the mobile terminal 110 is located, based on the determined location information of the mobile terminal 110. For example, if the determined location information of the mobile terminal 110 corresponds to a front of Gwanghwamun Gate, the location information determining system 100 may provide one or more pieces of music associated with Gwanghwamun Gate, such as 'Love song of Gwanghwamun Gate', etc., to the mobile terminal 110.

Also, in response to the mobile terminal 110 executing a location-based game app, the location information determining system 100 may configure, as a single team, gamers present in the same area as or a neighboring area of the region in which the mobile terminal 110 is located, based on the determined location information of the mobile terminal 110, and may provide the configured team of gamers to the mobile terminal 110.

Although FIG. 6 describes the mobile terminal 110 and the location information determining system 100 as separate apparatuses, it is only an example. The mobile terminal 110 may be the location information determining system 100. For example, the mobile terminal 110 may execute a location-based app, such as a weather app, a discount information app, etc., and may determine location information that matches cell information and administrative district information of the mobile terminal 110. The mobile terminal 110 may display a location-based service based on the determined location information and administrative district information for the user.

Figure 7:
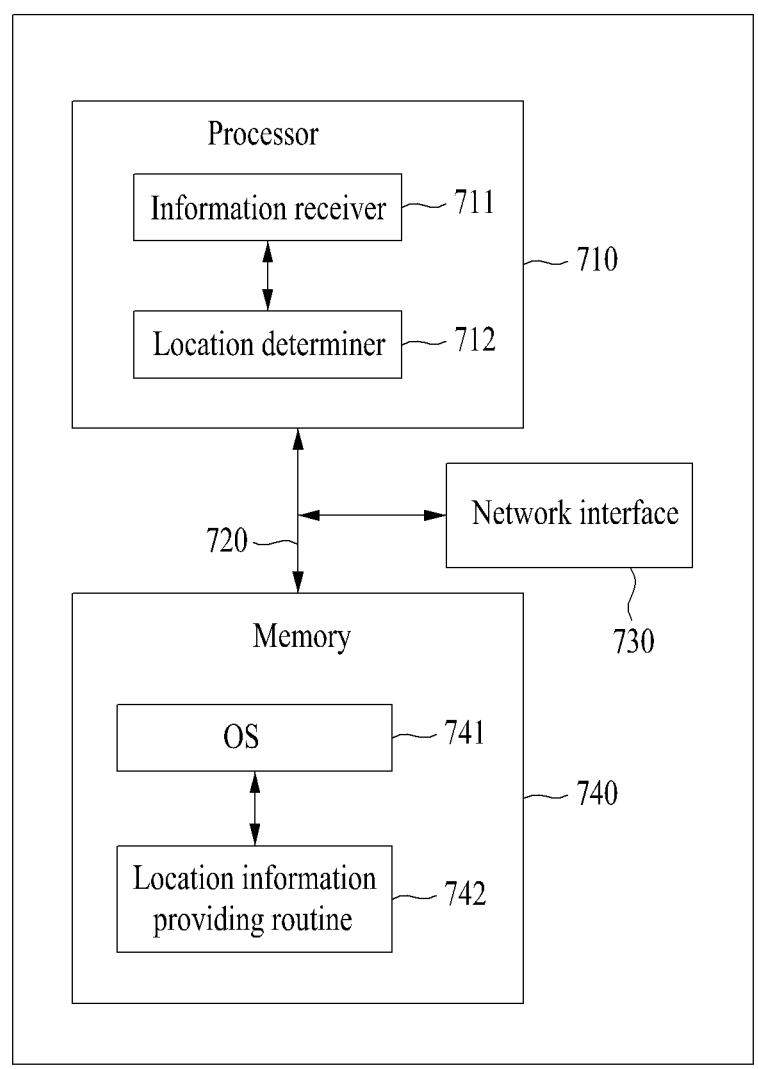
FIG. 7 is a block diagram illustrating a configuration of a location information determining system according to at least one example embodiment.

FIG. 7 is a block diagram illustrating a configuration of a location information determining system according to at least one example embodiment.

In FIG. 7, a location information determining system 700 may be a separate apparatus that communicates with a mobile terminal in a wired or wireless manner, and may also be the mobile terminal itself.

Referring to FIG. 7, the location information determining system 700 may include a processor 710, a bus 720, a network interface 730, and a memory 740. The memory 740 may include an operating system (OS) 741 and a location information providing routine 742.

The processor 710 may include an information receiver 711 and a location determiner 712, and may be configured by executing the location information providing routine 742 stored in the memory 740. According to other example embodiments, the location information determining system 700 may include a greater or lesser number of constituent elements of FIG. 7. However, there is no need to clearly illustrate many constituent elements according to the related art. For example, the location information determining system 700 may include other constituent elements, such as a display and the like.

The memory 740 may include a permanent mass storage device, such as random access memory (RAM), read only memory (ROM), a disk drive, etc., as a computer-readable storage medium. Also, program codes (e.g., computer-readable instructions) for the OS 741 and the location information providing routine 742 may be stored in the memory 740. Such software constituent elements may be loaded from another computer-readable storage medium separate from the memory 740 using a drive mechanism (not shown). The other computer-readable storage medium may include, for example, a floppy drive, a disk, a tape, a DVD/CD-ROM drive, a memory card, etc. Software constituent elements may be loaded to the memory 740 through the network interface 730 instead of, or in addition to, the computer-readable storage medium.

The bus 720 enables communication and data transmission between the constituent elements of the location information determining system 700. The bus 720 may be configured using a high-speed serial bus, a parallel bus, a storage area network (SAN), and/or another appropriate communication technology.

The network interface 730 may be a computer hardware element for connecting the location information determining system 700 to the computer network. The network interface 730 may connect the location information determining system 700 to the computer network through a wireless and/or wired connection.

The processor 710 may be configured to process computer-readable instructions of a computer program by performing a basic arithmetic operation, a logic operation, and an input/output operation of the location information determining system 700. The computer-readable instructions may be provided from the memory 740 and/or the network interface 730 to the processor 710 through the bus 720. The processor 710 may be configured to execute program codes for the information receiver 711 and the location determiner 712. The program codes may be stored in a storage device, such as the memory 740.

The information receiver 711 and the location determiner 712 may be configured to perform operations 201 through 203 of FIG. 2 and operations 301 through 303 of FIG. 3.

In response to the mobile terminal 110 executing an app and requesting a location-based service, the information receiver 711 may receive cell information from the mobile terminal 110. For example, in response to the mobile terminal 110 executing an app for requesting weather information, the information receiver 711 may receive cell information of the mobile terminal 110 from the mobile terminal 110.

Here, the cell information may include at least one of identification information of a country in which the mobile terminal 110 is located, communication company identification information, LAC information, identification information of a base station to which the mobile terminal 110 belongs, and identification information of a cell covered by the base station.

The location determiner 712 may search the location information database 113 for location information that matches the cell information of the mobile terminal 110 received at the information receiver 711, and may determine the found location information as location information of the mobile terminal 110.

Here, location coordinates corresponding to a centroid value of a cell covered by each base station may be matched to at least one piece of cell information and pre-stored in the location information database 113 as the location information of the mobile terminal 110.

The mobile terminal 110 may display the determined location information of the mobile terminal 110. Here, the mobile terminal 110 may also display a location-based service based on the determined location information of the mobile terminal 110.

Also, location coordinates corresponding to a centroid value of a cell covered by each base station may be matched to cell information and administrative district information, and pre-stored in the location information database 113.

The location determiner 712 may search for the location information database 113 for location information that matches cell information and administrative district information of the mobile terminal 110 received at the information receiver 711. The found location information may be determined as location information of the mobile terminal 110. The mobile terminal 110 may display the determined location information and the found administrative district information together.

For example, in response to a request from the mobile terminal 110 for a weather information service, the mobile terminal 110 may display weather information of an administrative district to which the mobile terminal 110 belongs, based on the determined location information and administrative district information.

Here, location information of the mobile terminal 110 may include current location coordinates or approximate location coordinates of the mobile terminal 110 within a cell covered by a base station to which the mobile terminal 110 belongs.

Also, the location determiner 712 may update location information of the mobile terminal 110 based on additional location information, such as a GPS of the mobile terminal 110, neighboring WiFi, a beacon, etc. The mobile terminal 110 may update and display location information of the mobile terminal 110.

For example, the information receiver 711 may receive additional location information, such as GPS information of the mobile terminal 110, neighboring WiFi, a beacon, etc. The location determiner 712 may calculate current location coordinates of the mobile terminal 110 based on additional location information, such as GPS, WiFi, etc. Here, since a time is used to calculate the current location coordinates, the location determiner 712 may preferentially determine location information that matches the cell information as location information of the mobile terminal 110.

The mobile terminal 110 may preferentially display the determined location information and the location-based service. Once calculation of current location coordinates is completed, the mobile terminal 110 may update the location information of the mobile terminal 110 with the calculated current location coordinates and thereby display the same. As the location information of the mobile terminal 110 is updated, the location-based service may also be updated.

For example, a location of the mobile terminal 110 displayed on the mobile terminal 110 may be updated from location coordinates corresponding to a centroid value of the cell to GPS or WiFi coordinates. Here, if location coordinates corresponding to the centroid value of the cell are equal to an administrative district of the updated coordinates, information provided from the location-based service may be provided without being changed.

On the contrary, if location coordinates corresponding to the centroid value of the cell differs from the administrative district of the updated coordinates, information provided from the location-based service may be updated with information based on the updated coordinates. For example, if location coordinates corresponding to the centroid value of the cell belongs to an administrative district, region A, and an administrative district of the updated coordinates is region B, weather information of the region A may be updated with weather information of the region B. In general, many small base stations, such as femtocells, microcells, etc., may be installed in a downtown area. Thus, in many cases, a single cell is the same administrative district. Also, in many cases, even a neighboring cell may be the same administrative district. Accordingly, although location coordinates corresponding to the centroid value of the cell differs from the updated coordinates, the location determiner 712 may provide an accurate location-based service in that the location-based service is provided based on an administrative district unit.

Here, location information that matches cell information may be absent in the location information database 113.

In this example, the location determiner 712 may determine at least one neighboring base station adjacent to a base station to which the mobile terminal 110 belongs, from the location information database 113, based on the cell information. Here, the location determiner 712 may compare the cell information to cell information stored in the location information database 113, and may search for at least one neighboring base station adjacent to the base station to which the mobile terminal 110 belongs.

The location determiner 712 may estimate a location of the base station to which the mobile terminal 110 belongs based on cell identifier information of a neighboring base station. The location determiner 712 may determine location information of the mobile terminal 110 based on a cell shape corresponding to the estimated location. The mobile terminal 110 may display the determined location information.

Here, the location determiner 712 may match location information corresponding to the centroid value of the cell to cell information of the base station to which the mobile terminal 110 belongs, and may add the matching information to the location information database 113.

Figure 8:
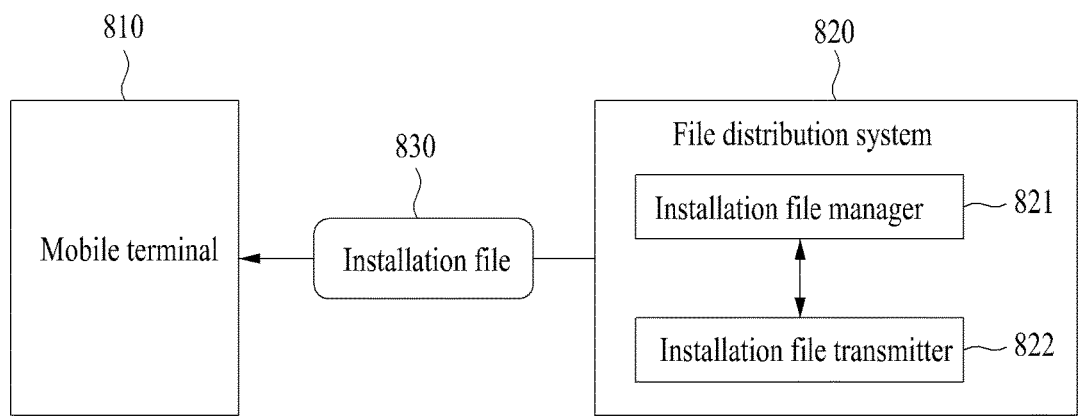
FIG. 8 is a block diagram illustrating an example of an execution environment of a location-based service providing method according to at least one example embodiment.

FIG. 8 is a block diagram illustrating an example of an execution environment of a location-based service providing method according to at least one example embodiment. FIG. 8 illustrates a mobile terminal 810 of a user, a file distribution system 820, and an installation file 830.

The mobile terminal 810 may be a portable device of the user capable of performing mobile communication and data communication, such as a smartphone. The file distribution system 820 may be a server that provides the installation file 830. For example, the file distribution system 820 may include an installation file manager 821 configured to store and manage the installation file 830, and an installation file transmitter 822 configured to transmit the installation file 830 to the mobile terminal 810 in response to a request from the mobile terminal 810.

The mobile terminal 810 may install an application through the installation file 830 received from the file distribution system 820, and may perform the location information determining method and the location-based service providing method based on the determined location information according to the example embodiments, in response to the installed application.

For example, the application may control the mobile terminal 810 to determine location information that matches cell information of the mobile terminal 810 as location information of the mobile terminal 810 by referring to a location information database. Location information that matches each of a plurality of pieces of cell information may be pre-stored in the location information database. The application may control the mobile terminal 810 to display location information of the mobile terminal 810 and content of a location-based service based on the location information.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of determining location information based on cell information, the method comprising:

receiving, using at least one processor, cell information related to a base station servicing at least one mobile terminal;

determining, using the at least one processor, approximate location information based on the cell information using a location information database configured to store location information associated with a plurality of cell information, the stored location information including a plurality of location information gradation levels, the plurality of location information gradation levels including a state gradation level, a city gradation level, a neighborhood gradation level, a street gradation level, and a city block gradation level;

determining, using the at least one processor, a desired gradation level from the plurality of location information gradation levels associated with a location-based service;

extracting, using the at least one processor, the approximate location information corresponding to the desired gradation level associated with the location-based service from the location information database and the determined approximate location information; and transmitting, using the at least one processor, the location-based service to the at least one mobile terminal based on the extracted approximate location information, wherein the determining the approximate location information based on the cell information includes, determining at least one neighboring base station adjacent to the base station servicing the at least one mobile terminal based on the cell information, estimating a location of the base station servicing the at least one mobile terminal based on cell identifier information of the at least one neighboring base station, calculating a centroid value of a cell covered by the base station servicing the at least one mobile terminal based on a cell shape corresponding to the estimated location of the base station, and determining location information corresponding to the centroid value of the cell as location information of the at least one mobile terminal.

2. The method of claim 1, wherein the approximate location information includes location coordinates corresponding to a centroid value of the base station servicing the at least one mobile terminal calculated based on a cell shape of the base station servicing the at least one mobile terminal.

3. The method of claim 1, wherein the determining the approximate location information based on the cell information comprises determining administrative district information of a region corresponding to the approximate location information.

4. The method of claim 1, further comprising:

matching, using the at least one processor, location information corresponding to the centroid value of the cell and cell information of the base station servicing the at least one mobile terminal; and adding, using the at least one processor, the matching information to the location information database.

5. The method of claim 1, wherein the approximate location information includes current location coordinates or approximate location coordinates of the mobile terminal in a cell covered by the base station servicing the at least one mobile terminal.

6. The method of claim 1, wherein the location-based service is at least one of:

a weather information providing service, a discount coupon providing service, an information providing service, a restaurant related information providing service, a financial related service, a music providing service, and a direction providing service.

7. The method of claim 1, further comprising:

receiving, using the at least one processor, global positioning system (GPS) information or additional location information of the at least one mobile terminal from a satellite; and updating, using the at least one processor, the approximate location information of the at least one mobile terminal based on the GPS information or the additional location information of the at least one mobile terminal.

8. The method of claim 1, wherein the cell information includes at least one of identification information of a country in which the at least one mobile terminal is located, communication company identification information, location area code (LAC) information, identification information of a base station servicing the at least one mobile terminal, and identification information of a cell covered by the base station.

9. The method of claim 8, wherein the determining the approximate location information based on the cell information comprises displaying a region to which the at least one mobile terminal belongs to be refined as coverage of the region becomes narrower.

10. The method of claim 1, wherein the determining the approximate location information based on the cell information comprises determining location information that matches previous cell information as approximate location information of the at least one mobile terminal in response to absence of current cell information of the at least one mobile terminal.

11. A location information determining system comprising:

a memory having computer readable instructions stored thereon; and at least one processor configured to execute the computer readable instructions to, receive cell information related to a base station servicing at least one mobile terminal, determine approximate location information based on the cell information using a location information database configured to store location information associated with a plurality of cell information, the stored location information including a plurality of location information gradation levels, the plurality of location information gradation levels including a state gradation level, a city gradation level, a neighborhood gradation level, a street gradation level, and a city block gradation level, determining, using the at least one processor, a desired gradation level from the plurality of location information gradation levels associated with a location-based service, extracting, using the at least one processor, the approximate location information corresponding to the desired gradation level associated with the location-based service from the location information database and the determined approximate location information, and transmitting, using the at least one processor, the location-based service to the at least one mobile terminal based on the extracted approximate location information, wherein the determining the approximate location information based on the cell information includes, determining at least one neighboring base station adjacent to the base station servicing the at least one mobile terminal based on the cell information, estimating a location of the base station servicing the at least one mobile terminal based on cell identifier information of the at least one neighboring base station, calculating a centroid value of a cell covered by the base station servicing the at least one mobile terminal based on a cell shape corresponding to the estimated location of the base station, and determining location information corresponding to the centroid value of the cell as location information of the at least one mobile terminal.

12. The location information determining system of claim 11, wherein the approximate location information includes location coordinates corresponding to a centroid value of the base station servicing the at least one mobile terminal calculated based on a cell shape of the base station servicing the at least one mobile terminal.

13. The location information determining system of claim 11, wherein the at least one processor is further configured to:

determine administrative district information of a region corresponding to the approximate location information.

14. The location information determining system of claim 11, wherein the at least one processor is further configured to:

match location information corresponding to a centroid value of the cell and cell information of the base station servicing the at least one mobile terminal; and add the matching information to the location information database.

15. The location information determining system of claim 11, wherein the approximate location information includes a current location coordinates or an approximate location coordinates of the at least one mobile terminal in a cell covered by the base station servicing the at least one mobile terminal.

16. The location information determining system of claim 11, wherein the location-based service is at least one of:

a weather information providing service, a discount coupon providing service, an information providing service, a restaurant related information providing service, a financial related service, a music providing service, and a direction providing service.

17. The location information determining system of claim 11, wherein the location information of the at least one mobile terminal is updated based on global positioning system (GPS) information or additional location information of the at least one mobile terminal.

18. A file distribution system for distributing an installation file for installing an application on a mobile terminal of a user, the file distribution system comprising:

a memory having computer readable instructions stored thereon; and at least one processor configured to execute the computer readable instructions to, store and manage the installation file; and transmit the installation file to the mobile terminal in response to a request from the mobile terminal, wherein the application is configured to, control the mobile terminal to receive cell information related to a base station servicing the mobile terminal, control the mobile terminal to determine approximate location information based on the cell information using a location information database configured to store location information associated with a plurality of cell information, the stored location information including a plurality of location information gradation levels, the plurality of location information gradation levels including a state gradation level, a city gradation level, a neighborhood gradation level, a street gradation level, and a city block gradation level, control the mobile terminal to determine a desired gradation level from the plurality of location information gradation levels associated with a location-based service, control the mobile terminal to extract the approximate location information corresponding to the desired gradation level associated with the location-based service from the location information database and the determined approximate location information, control the mobile terminal to receive the location-based service to the mobile terminal based on the extracted approximate location information, and control the mobile terminal to display the determined approximate location information of the mobile terminal and the location-based service, wherein the controlling the mobile terminal to determine the approximate location information based on the cell information includes, controlling the mobile terminal to determine at least one neighboring base station adjacent to the base station servicing the mobile terminal based on the cell information, controlling the mobile terminal to estimate a location of the base station servicing the mobile terminal based on cell identifier information of the at least one neighboring base station, controlling the mobile terminal to calculate a centroid value of a cell covered by the base station servicing the mobile terminal based on a cell shape corresponding to the estimated location of the base station, and controlling the mobile terminal to determine location information corresponding to the centroid value of the cell as location information of the mobile terminal.

19. A mobile terminal, comprising:

a memory having computer readable instructions stored thereon; and at least one processor configured to execute the computer readable instructions to, connect to a base station associated with a data network, receive cell information from a base station, the cell information including at least one of location area code (LAC) information, identification information of the base station, coverage area information related to the area covered by the base station, transmit a request for a location-based service, the request including the received cell information and a mobile terminal identifier, wherein the request causes a server to, determine approximate location information based on the cell information using a location information database configured to store location information associated with a plurality of cell information, the stored location information including a plurality of location information gradation levels, the plurality of location information gradation levels including a state gradation level, a city gradation level, a neighborhood gradation level, a street gradation level, and a city block gradation level, determine a desired gradation level from the plurality of location information gradation levels associated with the location-based service, and extract the approximate location information corresponding to the desired gradation level associated with the location-based service from the location information database and the determined approximate location information, and the at least one processor is further configured to receive the location-based service in response to the request, wherein the determining the approximate location information based on the cell information includes, determining at least one neighboring base station adjacent to the base station servicing the mobile terminal based on the cell information, estimating a location of the base station servicing the mobile terminal based on cell identifier information of the at least one neighboring base station, calculating a centroid value of a cell covered by the base station servicing the mobile terminal based on a cell shape corresponding to the estimated location of the base station, and determining location information corresponding to the centroid value of the cell as location information of the mobile terminal.

20. The mobile terminal of claim 19, wherein the at least one processor is further configured to perform the receive the location-based service by:

determining administrative district information based on the received cell information and centroid information stored in the location information database associated with the base station;

storing the administrative district information in the location information database in association with the mobile terminal identifier;

extracting approximate location information related to the mobile terminal based on the determined gradation level and the stored administrative district information; and receiving the location-based service, the location-based service provided based on the extracted approximate location information.

21. The mobile terminal of claim 19, wherein the location-based service is at least one of a weather information providing service, a discount coupon providing service, an information providing service, a restaurant related information providing service, a financial related service, a music providing service, and a navigation service.

22. The mobile terminal of claim 19, wherein the at least one processor is further configured to:

update the cell information upon receiving a user instruction to request the location-based service; and update the cell information when the mobile terminal connects to a second base station.

* * * * *